United States Patent [19]

Hadfield

[11] Patent Number: 5,160,808
[45] Date of Patent: * Nov. 3, 1992

[54] ACCESS MEANS FOR FLUSH FLOOR FITTING

[75] Inventor: Robert W. Hadfield, Parkersburg, W. Va.

[73] Assignee: Butler Manufacturing Company, Kansas City, Mo.

[*] Notice: The portion of the term of this patent subsequent to Nov. 28, 2006 has been disclaimed.

[21] Appl. No.: 759,885

[22] Filed: Sep. 13, 1991

Related U.S. Application Data

[60] Continuation of Ser. No. 424,721, Oct. 20, 1989, abandoned, which is a division of Ser. No. 222,054, Jul. 20, 1988, Pat. No. 4,883,924.

[51] Int. Cl.$^5$ ............................................... H02G 3/12
[52] U.S. Cl. ........................................................ 174/48
[58] Field of Search ............................ 174/48, 66, 67; 220/241, 242

[56] References Cited

U.S. PATENT DOCUMENTS

| | | | |
|---|---|---|---|
| 2,787,398 | 4/1957 | Smith | 220/266 X |
| 3,859,454 | 1/1975 | Mann | 174/66 |
| 4,883,924 | 11/1989 | Hadfield | 174/48 |

Primary Examiner—Leo P. Picard
Assistant Examiner—David A. Tone
Attorney, Agent, or Firm—Frederick J. Olsson

[57] ABSTRACT

Simplified access device for flush floor fittings in the form of a track mounted slider. The slider can be manipulated between a closed position wherein the interior of the fitting is shut off to any desired minimum opening position to accommodate exiting of one or more cables. The slider is never divorced from the fitting and so is available in the event the station is abandoned.

5 Claims, 3 Drawing Sheets

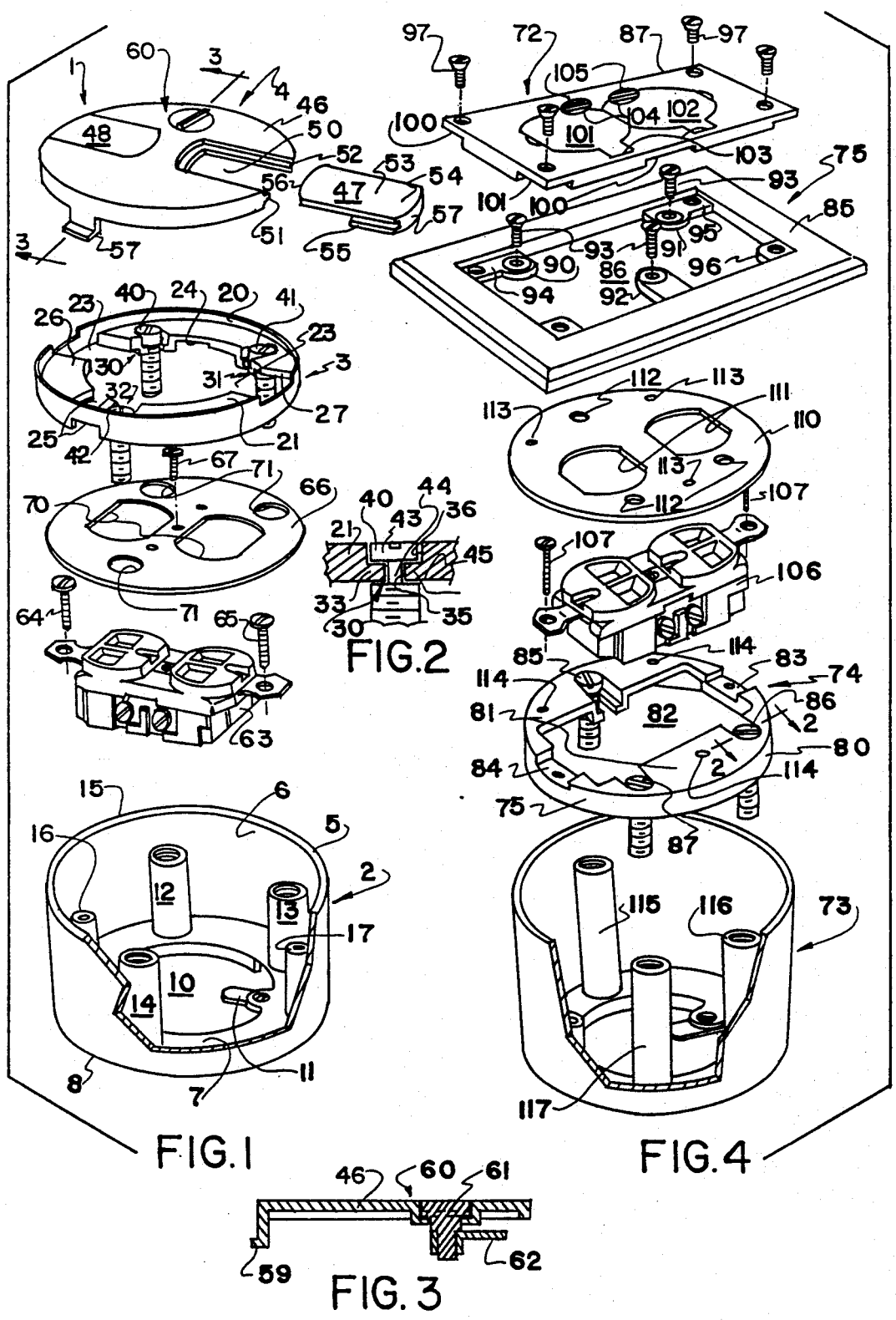

ACCESS MEANS FOR FLUSH FLOOR FITTING

This application is a continuation of application Ser. No. 424,721 filed Oct. 20, 1989, now abandoned, which was a division of application Ser. No. 222,054 filed Jul. 20, 1988 and now U.S. Pat. No. 4,883,924.

This invention relates to electrical distribution systems for buildings which employ underfloor duct carrying power cable (high tension) and underfloor duct carrying telephone, data, and computer cable(low tension).

More particularly, the invention relates to outlet fittings buried in the concrete floor and connected to the underfloor duct for making high tension and low tension service available at the floor level.

The principal object of the invention is to provide a simplified access means for flush floor fittings in the form of a track-mounted slider which can be manipulated between a closed position wherein the interior of the fitting is shut off to any desired minimum opening position to accomodate exiting of one or more cables. The slider is never divorced from the fitting and so is available in the event the station is abandoned.

The invention will be described below in connection with the following drawings wherein:

FIG. 1 is an exploded view illustrating the invention arranged for recessed high tension service;

FIG. 2 is a fragmentary view illustrating how the adjusting ring assembly is supported;

FIG. 3 is a view taken along the lines 3—3 of FIG. 1;

FIG. 4 is an exploded view illustrating the invention arranged for flush high tension service;

Figure 5:
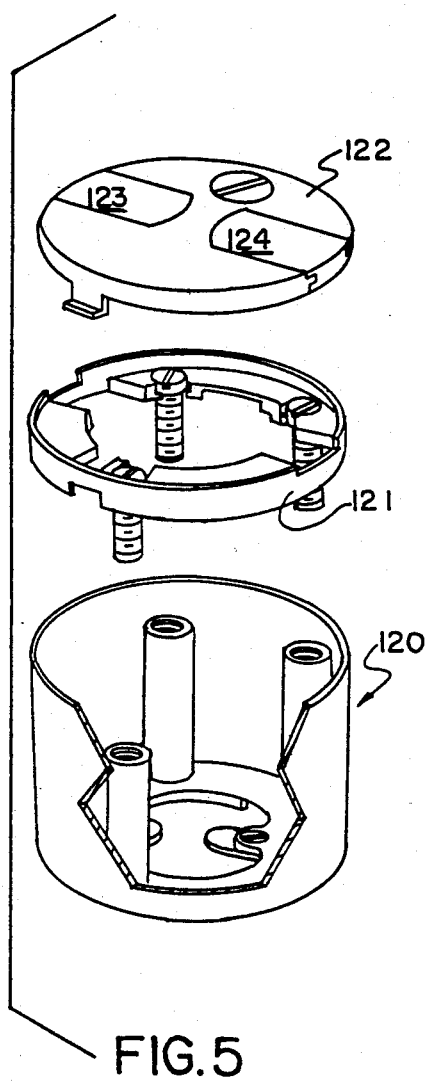
FIG. 5 is an exploded view illustrating the invention arranged for low tension service where the closure assembly is under the carpet and cables exit through slots in the carpet.

Referring to FIG. 1, the outlet fitting 1 has an attaching ring assembly 2, the adjusting ring assembly 3 and a closure assembly 4.

The attaching ring assembly 2 includes a hollow tubular body 5 having an interior wall 6 and an annular base member 7 on the lower end 8 of the body 5. The base member 7 is formed with the opening 10. The base member is adapted to rest on the top of the raceway or underfloor duct with which the fitting is used. The body is clamped in place by a pair of clamps, one of which is indicated at 11. These clamps are of the type shown in U.S. Pat. No. 3,322,442.

On the base member 7 are three adjusting ring support posts 12, 13, and 14 which extend upward from the base 10 toward the upper end 15. The posts are each of the same height and have internal threads as noted. The posts are positioned 120° apart and are spaced inwardly of the interior wall 6.

Also on the base member 7 are a pair of electrical component mounting posts 16 and 17 which extend up from the base toward the open end 15. The posts are the same height and are internally threaded as noted. The posts 16 and 17 are positioned 180° apart and are spaced inwardly of the interior wall 6.

The adjusting ring assembly includes an outer annular wall 20, support flange means 21 extending partially inwardly from the wall 20. The partial extension of the flange means 21 creates the opening 22. The flange means 21 has slots 23 the purpose of which is to accomodate flat conductor cable when the adjusting ring assembly is used in such a fitting. The underside of the flange means 21 is undercut at 24 and both the outer wall 20 and support flange 21 are cut away at 25. The outer wall is also cut away at 26 and 27. The purposes for the foregoing cutouts will be explained shortly.

The support flange 21 is formed with three identical adjusting ring support means 30, 31, and 32 spaced 120° apart. The description of the ring support means will be done in connection with FIG. 2 which shows the support 30. The support 30 comprises a pair of spaced apart ring support lips 33 and 34, the space 35 between the lips, and the head slot 36. As will be observed, the lips 33 and 34 extend radially toward the center of the assembly and the space 35 and slot 36 are in communication with the opening 32.

The ring support means 30, 31, and 32 carry adjusting screws 40, 41, and 42. The adjusting screws are identical and are respectively adapted to be threaded into the posts 12, 13, and 14. The adjusting screws mount the adjusting ring assembly as best shown in FIG. 2 where the screw 40 has a head 43 within the head slot 36 and a reduced section 44 in the space 36. The reduced section 44 forms a ledge 45 on which rests the lips 33 and 34. The screws 40, 41, and 42 are turned to move the adjusting ring up or down for leveling purposes.

The closure assembly 4 includes the substantially flat plate means 46 carrying access sliders 47 and 48 which can be moved into and out of openings in the plate means. The opening for the slider 47 is shown at 50. There is an identical opening for the slider 47. The openings are for the purpose of providing passageway for high tension cables.

As shown the slider 47 has been moved out of the opening 50 while the slider 48 is moved all the way into its opening and completely covers the same. As will be evident, the openings are fully or partially covered depending upon the positions of the sliders.

The sliders 47 and 48 are mounted in the respective openings by key and keyway means which not only permit the sliding motion, but also provide for each slider to be reversed 180° (around a vertical axis) and retain the sliding motion. The opening 50 has a pair of keys 51 and 52. The slider 47 has a thin section 53, a thickened section 54 formed with keyways one of which is noted at 55. It will be evident that the key and keyway arrangement permits the sliders to be easily moved into and out of the opening.

It is to be noted that the cut outs 26 and 27 in the outer wall 20 of the adjusting ring assembly 3 are for the purpose of accomodating the thickened sections of the sliders. The opposite ends of the sliders are round as indicated at 56 and 57 for slider 47.

In the position as shown in FIG. 1, the thickened section of each slider is located on the outward side and the top surface of each slider is flush with the top surface of the plate 46.

When a high tension cable exits through the opening, the slider is placed in position so that thickened section 54 engages the cable. The thin section 53 will extend radially outwardly over the top 15 of the body 5 underneath the carpet. The thin sections make no perceptible rise in the carpet surface.

The closure assembly 4 also includes securing means for releasably securing the plate 46 to the adjusting ring assembly 3. This includes the foot 59 and the assembly 60.

The foot 59 is adapted to fit into the cutout 25 and engage the underside of the wall 20. The assembly 60 includes a button 61 rotatably mounted in plate 46 and a locking tang 62. The button 61 can be moved by the fingers. For locking purposes foot 59 is positioned under the wall 20 and the tang is rotated into the cutaway 24 so that it engages the underside of the flange 21.

The outlet fitting of FIG. 1 is arranged for recessed power and for this purpose the fitting includes receptacle 63 which is adapted to be mounted on the posts 16 and 17 by screws 64 and 65. A receptacle plate 66 is secured to the receptacle by screws 67. The plate 66 has clearance apertures 70 for the tops of the receptacle bodies and clearance apertures 71 for the posts 12, 13, and 14.

From the foregoing description, the assembly of the components of FIG. 1 will be self-evident to those skilled in the art and need not be described further. Suffice it to say that when assembled the top surface of the plate 46 is flush or just slightly above the top 15 of the body 5.

Before proceeding with the description of the other outlet fittings, it is pointed out that a typical body 5 is approximately four inches in diameter, 3/32 inches thick, and has a length of between 2 inches and 3⅛ inches depending upon the thickness of the concrete above the level of the underfloor ducts. Thus, for descriptive purposes, some of the bodies of the attaching ring assembly to be described will have different lengths.

Referring to FIG. 4, the outlet fitting 72 is for a flush high tension arrangement. The outlet fitting 72 has an attaching ring assembly 73, an adjusting ring assembly 74, and a closure assembly 75.

The attaching ring assembly 73 is identical in construction to the attaching ring assembly 2 of FIG. 1 except that the body 73 is longer in length than the body 5.

The adjusting ring assembly 74 has a similar construction as the assembly 3 with changes as noted following. The assembly 74 includes an outer annular wall 80, inwardly extending support flange means 81 which forms the opening 82. The outer wall 80 of support flange 81 is cut away to form receptacle supports 83 and 84.

The adjusting screw support means 85, 86, and 87 are formed in the support flange 81 and have a construction the same as the adjusting ring support means 30, 31, and 32.

The closure assembly 75 includes an annular carpet flange 85 with an opening 86 within which is a cover plate 87.

The carpet flange has inboard lugs 90, 91, and 92 with clearance apertures for receiving screws 93 and inboard lug 94, 95, and 96 having threaded holes. The cover plate 87 is adapted to be mounted on the lugs 90-96.

The cover plate 87 has clearance apertures for receiving the screws 97. The bottom of the cover plate 87 is undercut to form cavities receiving the various lugs in the carpet flange. Some of these undercuts are indicated at 100.

The cover plate 87 also has openings(not shown) which receive the lids 101 and 102. The lids are pivotally mounted on the cover plate at 103. Locking screws 104 are rotatably mounted on the cover plate and each has a flat 105. As shown, the lids are in a closed position and the locking screw heads overlie the lids and hold the same in position. When rotated 180°, the flats 105 permit the lids to be pried upwardly to an open position.

As previously indicated the outlet fitting 72 is arranged for flush access power. For this purpose, the fitting includes the receptacle 106 adapted to be mounted on the support 83 and 84 by screws 107. A gasket 110 has clearance holes 111 for the tops of the receptacle bodies, clearance holes 112 to provide access to the screws for the assemblies 85, 86, and 87 and clearance holes 113 for the screw 93 to be threaded into the threads 114 in the adjusting ring assembly 74.

It will be apparent that the screws 97 operating in threaded holes in the lugs 94-96 hold the cover plate in position and that the screws 93 operating in the threaded holes in the adjusting ring hold the closure 75 in place. Further, it will be understood that in the fitting of FIG. 4 the electrical component support posts are not used and that the screws of the assemblies 85, 86, and 87 thread into the threads of the adjusting screw posts 115, 116, and 117.

The outlet fitting shown in FIG. 5 is arranged for low tension service wherein the cables exit through slits in the carpet. In FIG. 5 the attaching ring assembly 120 has the same structure as the attaching rings previously described. The adjusting ring 121 has the same structure as the adjusting ring assembly 3 of FIG. 1. The closure assembly 122 has the same structure as the closure assembly 4 of FIG. 1. As will be readily apparent, the prime difference between fittings of FIG. 5 and that of FIG. 1 is that in FIG. 5 the receptacle and the receptacle plate have been omitted. The sliders 123 and 124 in the assembly function as previously described for sliders 47 and 48.

Figure 6:
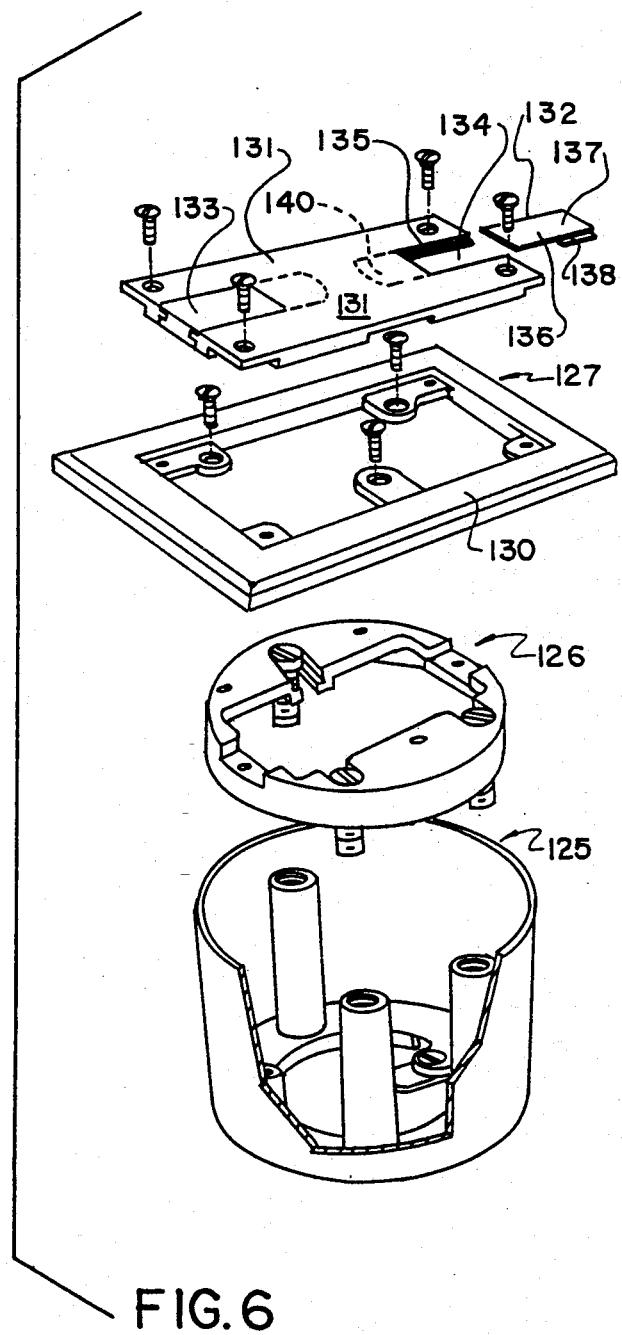
FIG. 6 is an exploded view illustrating the invention arranged for flush low tension service where the closure assembly is visible and flush with the carpet and cables exit through openings in the assembly.

The outlet fitting of FIG. 6 is arranged for low tension flush service.

The attaching ring 125 and the adjusting ring 126 are the same as the attaching ring 73 and 74 of FIG. 4. In the closure assembly 127, the carpet flange 130 is the same as the carpet flange 85. In the cover plate 131 the flip lids 101 and 102 have been eliminated and sliders 132 and 133 are employed. The sliders are identical and the description will be in connection with slider 132. The opening 134 in the cover 131 has a pair of keys one of which is noted at 135. The slider 132 has a thin section 136 and a thick section 137. The thick section 137 has a pair of keyways one of which is indicated at 138.

When a cable is to exit from the fitting, the slider 132 is removed and rotated 180° (around a horizontal axis) and returned to the cover with the thin section 136 entering a cutout 140 on the underside of the cover. Thus, the cable exits on the outboard side of opening 134.

Figure 7:
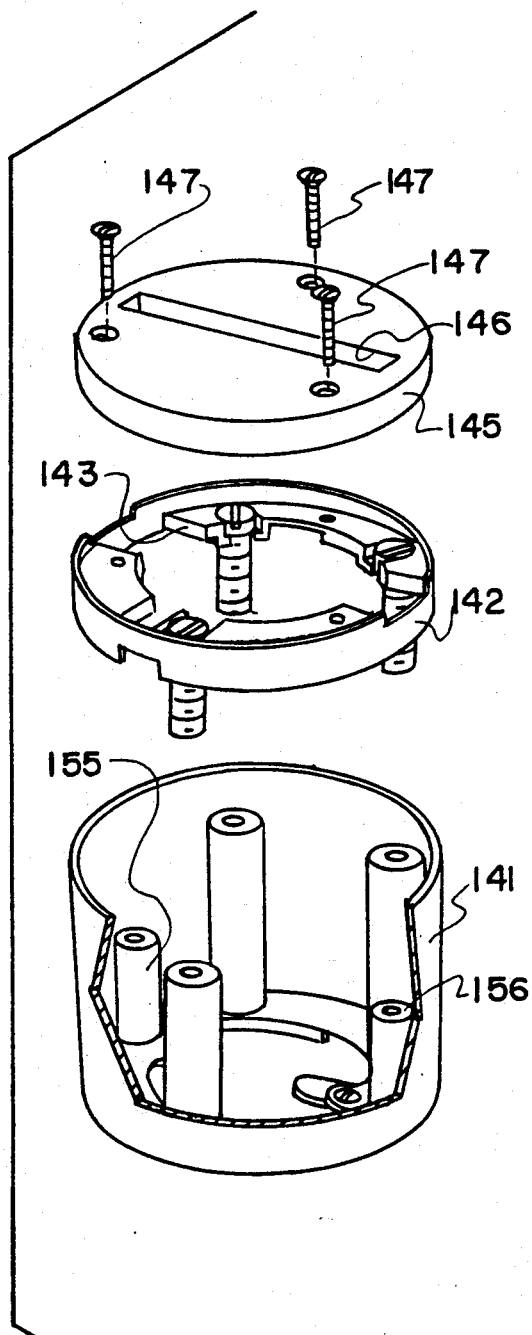
FIG. 7 is an exploded view illustrating the invention arranged for flat conductor cable service.

The outlet fitting of FIG. 7 is arranged for flat conductor cable.

The attaching assembly ring 141 and adjusting ring assembly 142 have the same structure as previously described for the corresponding assemblies in FIG. 1.

The adjusting ring assembly 142 is set up on the attaching ring so that the cutouts 143 and 144 are oriented as shown.

The closure assembly 145 has a slot 146 which is held in position by the screws 147. The slot 146 is oriented to be parallel with cutouts 143 and 144.

Figure 8:
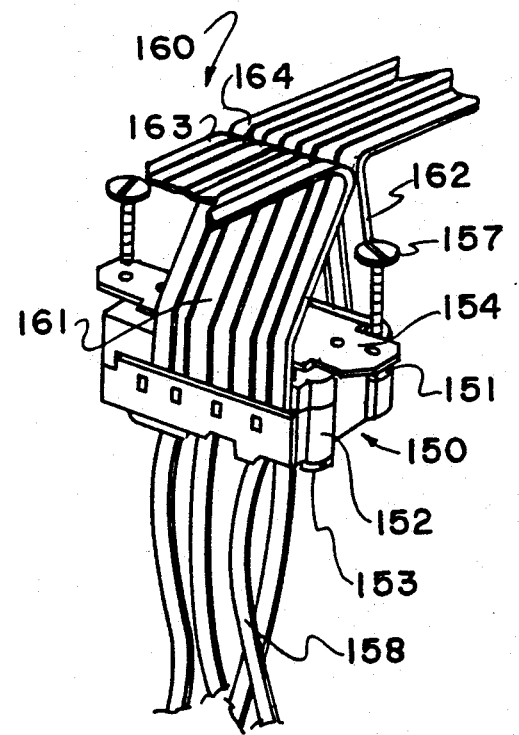
FIG. 8 is an isometric view of a flat conductor cable assembly as used in the outlet fitting of FIG. 7.

A typical transition block and flat conductor cable assembly is shown in FIG. 8.

A transistor block 150 is made up of an upper part 151 and a lower part 152 which are fastened together by the screws one of which is indicated at 153. The upper part carries a tab 154 by which the block is mounted on the compartment posts 155 and 156 by screws 157. The lower part 152 has terminals (not shown) by which the power conductors 158 are connected. The flat conductor cable 160 is secured by separating the upper and lower parts 151 and 152 and inserting the cable between same. When the parts 152 and 153 are reassembled the terminals in the lower part 152 penetrate the plastic cable covering and make contact with the conductors.

The opposite sides 161 and 162 of the cable are bent as shown so that the cables will exit through slot 146. Then the cable is again bent at 163 and 164 so the same run along the floor under the carpet.

The various attaching assemblies may be provided with a grounding post which extends upwardly from the base and is threaded for attaching a ground conductor.

I claim:

1. In combination:
flat, round plate means;
a pair of radially extending slots formed in said plate means;
each said slot being formed with facing keys;
each slot having a slider with keyways receiving said keys; and
each slider being moveable in its slot, the inner end of each slot and the opposite ends of each slider having substantially identical semi-circular surfaces.

2. In combination:
plate means having a top flat surface;
a slot extending inwardly from the periphery of said plate means;
the opposite sides of said slot respectively having a key, the keys facing one another;
a slider having a thin section and a thick section, each section being formed with a top flat surface with the surfaces being coplanar with one another and the thick section having a pair of keyways disposed on opposite sides thereof;
the slider being disposed in said slot with said keys being respectively received in said keyways and providing for the slider to be moveable back and forth in the slot and with the top flat surface on said plate means and the top flat surfaces on said slider being coplanar; and
said slider being disposed in said slot with said thin section extending outwardly of said periphery and the slot being partially open.

3. In combination:
plate means having a top flat surface;
a slot extending inwardly from the periphery of said plate means;
the opposite sides of said slot respectively having a key, the keys facing one another;
a slider having a thin section and a thick section, each section being formed with a top flat surface with the surfaces being coplanar with one another and the thick section having a pair of keyways disposed on opposite sides thereof;
the slider being disposed in said slot with said keys being respectively received in said keyways and providing for the slider to be moveable back and forth in the slot; and
said plate means having an undercut on the under side thereof and open to said slot and said slider being disposed in the slot with said thin section received in the undercut and the slider being located so that the slot is partially open.

4. In combination:
plate means having a top flat surface;
a slot extending inwardly from the periphery of said plate means;
the opposite sides of said slot respectively having a key, the keys facing one another;
a slider having discrete thin and thick sections disposed one after the other along the axis of the slider, each section extending fully across the width of the slider and each section being formed with a flat top surface, the flat top surfaces being coplanar with one another;
a pair of keyways respectively disposed on opposite sides of said thick section below said thin section, the thin section without keyways, and
said slider being disposed in said slot with said keys being respectively received in said keyways and providing for the slider to be moveable back and forth in the slot and with the top flat surface on said plate means and the top flat surfaces on said slider being coplanar.

5. In combination:
plate means having a top flat surface;
a slot extending inwardly from the periphery of said plate means;
the opposite sides of said slot respectively having a key, the keys facing one another;
a slider having a thin section and a thick section, each section being formed with a top flat surface with the surfaces being coplanar with one another;
a pair of keyways respectively disposed on opposite sides of said thick section below said thin section, the thin section being without keyways;
said slider being disposed in said slot with said keys being respectively received in said keyways and providing for the slider to be moveable back and forth in the slot;
said plate means having an undercut on the under side thereof and open to said slot; and
said undercut and said thin section being dimensioned whereby the thin section is moveable back and forth in the undercut.

* * * * *